United States Patent [19]

Zifferer et al.

[11] Patent Number: 4,785,518
[45] Date of Patent: Nov. 22, 1988

[54] BAFFLE SUPPORT FIXTURE FOR MACHINES FOR ASSEMBLING TUBES IN A HEAT EXCHANGER

[75] Inventors: Morton F. Zifferer, 536 Owen Rd., York, Pa. 17403; Richard J. Tarlton, York, Pa.

[73] Assignee: Morton F. Zifferer, York, Pa.

[21] Appl. No.: 738,889

[22] Filed: May 29, 1985

Related U.S. Application Data

[63] Continuation of Ser. No. 630,752, Jul. 13, 1984, abandoned.

[51] Int. Cl.⁴ .............................................. B25B 27/14
[52] U.S. Cl. ................................................... 29/281.1
[58] Field of Search ..................... 269/43, 40, 903, 55; 29/726, 281.1, 271; 211/41

[56] References Cited

U.S. PATENT DOCUMENTS

| | | | |
|---|---|---|---|
| 3,294,244 | 12/1966 | Laughlin | 211/41 |
| 3,534,862 | 10/1970 | Shambelan | 211/41 |
| 3,789,479 | 2/1974 | Zifferer et al. | 29/726 |
| 3,970,041 | 7/1976 | Kircher | 211/41 |
| 4,074,422 | 2/1978 | Borjessom et al. | 269/903 |
| 4,079,497 | 3/1978 | Jarnigan | 269/43 |
| 4,221,299 | 9/1980 | Taylor | 211/41 |
| 4,319,951 | 3/1982 | Korbelak et al. | 269/903 |

Primary Examiner—Robert C. Watson
Attorney, Agent, or Firm—Robert B. Frailey

[57] ABSTRACT

A baffle support fixture for a machine for assembling automatically the tubes and baffles of a shell and tube type heat exchanger. The heat exchanger has the usual plurality of metallic tubes and perforated baffles through which the tubes pass. The baffles are non-metallic, and are composed of a soft and pliable or flexible gasket-like material. The machine is provided with a tube and baffle holding fixture mounted on a selectively movable work table. Opposing, horizontally spaced rods transmit selected quantities of tubes successively from a tube supply to the fixture and insert the tubes through the perforations in baffles supported vertically by the fixture. A pair of rigid, vertical, closely spaced plates stabilize each of the non-metallic baffles during the tube insertion cycles. Following each deposit of a selected number of tubes in the baffles supported by the fixture, the work table is adjusted prepatory to the transmission of the next selected quantity of tubes to the fixture.

5 Claims, 2 Drawing Sheets

BAFFLE SUPPORT FIXTURE FOR MACHINES FOR ASSEMBLING TUBES IN A HEAT EXCHANGER

This application is a continuation of application Ser. No. 630,752, filed July 13, 1984, now abandoned.

FIELD OF THE INVENTION AND THE PRIOR ART

The present invention concerns machines for assembling automatically the tubes and baffles of a shell and tube type heat exchanger. Such heat exchangers include a plurality of tubes of uniform length and a plurality of truncated, perforated baffles through which the tubes pass.

Automatic tube assembly machines of the type with which this invention is used are illustrated in Zifferer and Flinchbaugh U.S. Pat. No. 3,789,479, entitled "Machine for Assembling Tubes in Heat Exchangers". Such machines include a tube and baffle holding fixture mounted on a work table having capacity for selected vertical and horizontal movements. Two opposing sets of retractable guide rods advance successively selected quantities of tubes from a supply to the fixture, the individual rods of each set being aligned with corresponding rods of the opposing set. The machine includes means automatically operative to actuate the guide rods to advance the selected quantities of tubes from the supply to the fixture, means automatically operative to adjust the work table vertically and horizontally, following each transfer of tubes, to prepare for the transfer of the next selected quantity of tubes, and control means governing the movements of the guide rods and the work table.

Usually, the perforated baffles are constituted of relatively thin, rigid metal sheets well adapted to withstand, without distortion of movement, the axial forces occurring as a result of the penetrations of the guide rods and the tubes back and forth through the baffle apertures during assembly of the heat exchanger tubes. However, in many installations, it is preferred that the baffles be constituted of a non-metallic material, such as a relatively soft, pliable or flexible gasket-like material, which is readily bendable or otherwise distortable when subjected to relatively minor degrees of force.

In forming the perforations in such gasket-like baffles, the dies utilized for stamping the perforations in metal baffles also are used for forming the perforations in the non-metallic baffles. Following stamping, the perforations or holes in the gasket-like baffles have a tendency to shrink diameter-wise. Such phenomenon, while not at all undesirable as far as the completed heat exchanger is concerned, renders difficult the assembly of its tubes and baffles.

Because of the flexible character of the non-metallic or gasket-like baffles, and because of the tendency of their perforations to shrink, heat exchangers incorporating such baffles are extremely difficult to assemble by machine and nearly impossible to assemble by hand.

SUMMARY OF THE INVENTION

The primary object of this invention is to overcome the difficulties described above in assembling the tubes of a shell and tube type heat exchanger having baffles constituted of a soft, pliable or flexible gasket-like material.

A further object of the invention is to provide a baffle support fixture for machines for assembling automatically tubes in a heat exchanger, which permits the ready, efficient and quick assembly of the tubes in a heat exchanger having a plurality of baffles constituted of a soft and pliable non-metallic material.

A further object is to provide such a fixture which is adapted to be easily and quickly installed on a conventional machine for assembling automatically heat exchangers having metallic tubes and baffles, thereby enhancing the versatility and range of applicability of the machine.

A further object is to provide a baffle support fixture for automatic tube assembly machines for assembling tubes in heat exchangers having relatively soft and flexible baffles, in which spaced vertical baffle support plates are utilized to stabilize the baffles and maintain their perforations in proper alignment during assembly of the tubes.

Other objects and advantages of this invention will be readily apparent from the accompanying detailed description of the preferred embodiment thereof, which is illustrated in the views of the accompanying drawing.

DESCRIPTION OF THE INVENTION

Figure 1:
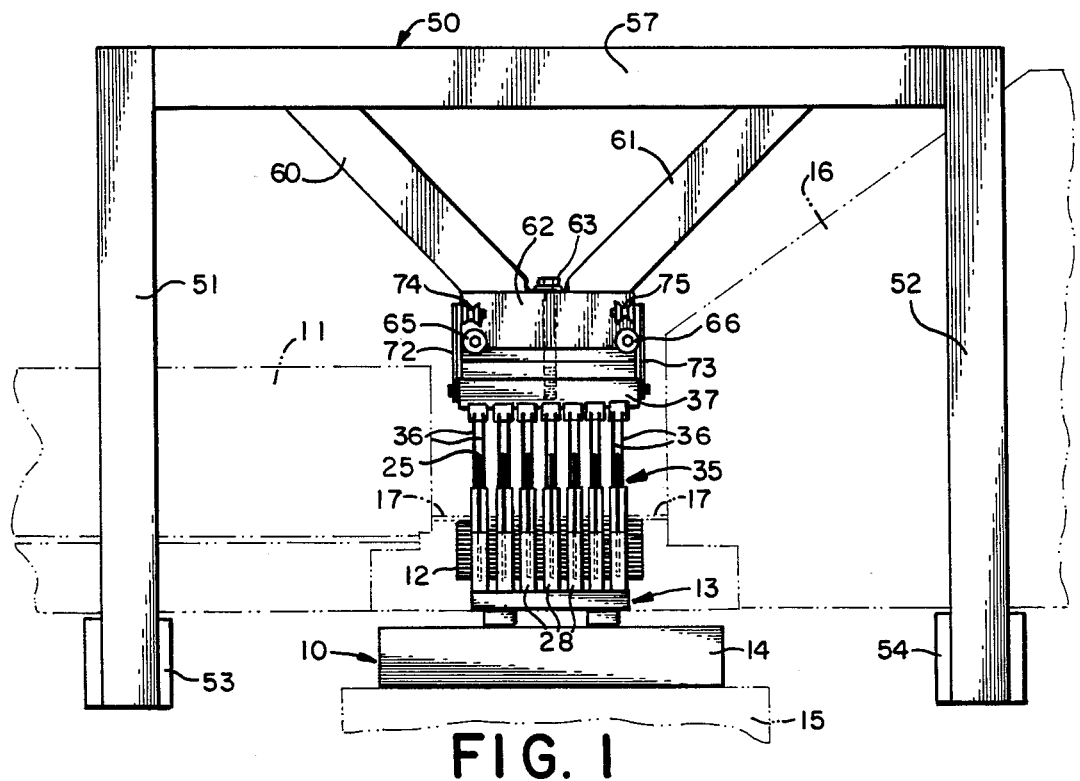
FIG. 1 is a fragmentary view in front elevation of a preferred embodiment of the fixture of this invention.

FIGS. 1–4 of the drawing illustrate the application of the preferred embodiment of the fixture of this invention to the automatic tube assembly machine illustrated in U.S. Pat. No. 3,789,479.

Figure 2:
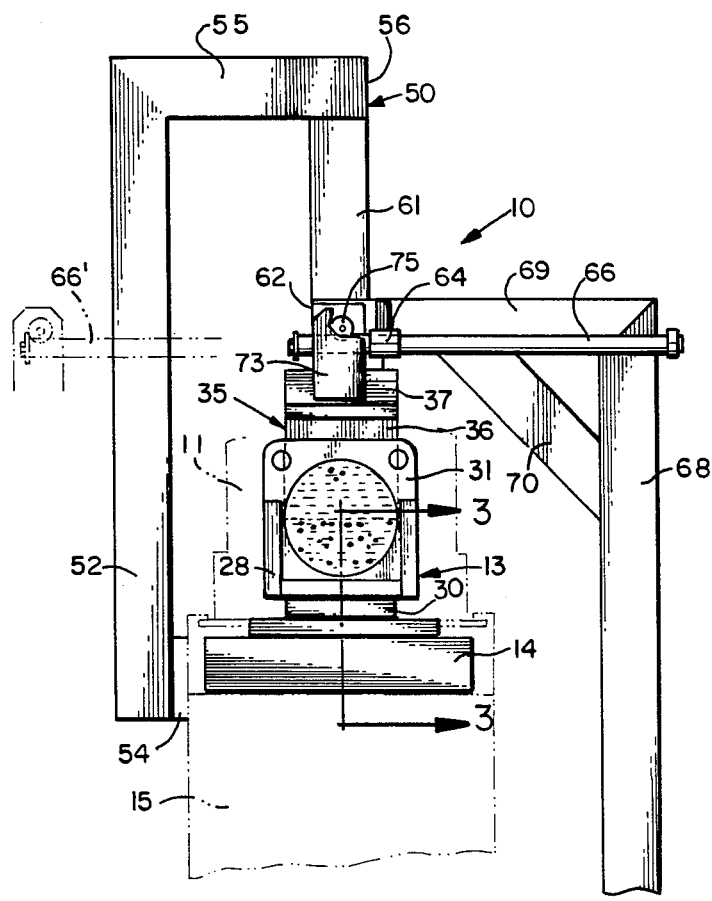
FIG. 2 is a fragmentary view in side elevation of the fixture shown in FIG. 1.

Referring first to FIGS. 1 and 2, where a portion of the machine 10 is illustrated, there is shown in phantom the usual supply 11 of elongated tubes 12 used in a conventional shell and tube type heat exchanger. Also shown is the tube and baffle holding fixture 13 affixed securely to the top of the vertically and horizontally movable work table 14 below which appears in phantom the usual table supporting structure 15 containing the table actuating means. Also shown in phantom is the support structure 16 for the several horizontal, retractable probe rods 20 (FIG. 3) which cooperate with their several corresponding, axially aligned, horizontal and retractable insertion rods 21 to remove selected quantities of tubes 12 from the supply 11 and transfer them to, and position them properly in, the tube and baffle supporting fixture 13. The structure 16 also houses the actuating and control means for the probe rods 20. As explained in U.S. Pat. No. 3,789,479 aforesaid, selected rods 20 and 21 are advanced and retracted successively along the single horizontal working plane 17 to assemble the tubes 12 in successive horizontal rows in the fixture 13.

Figure 4:
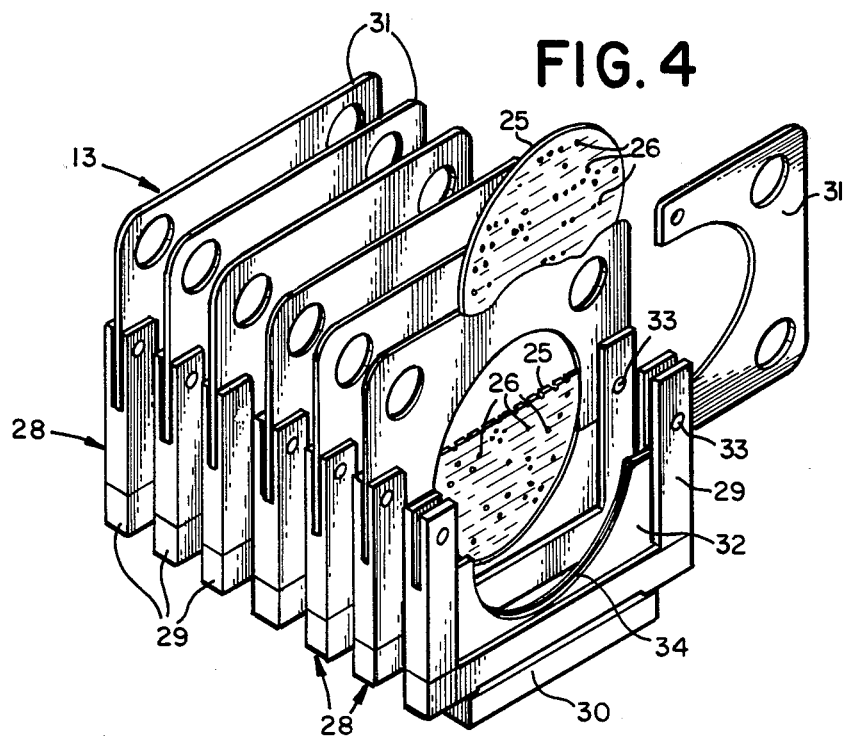
FIG. 4 is an enlarged view in perspective of the tube and baffle holding fixture of the machine.

Reference now is made to FIG. 4, where the tube and baffle holding fixture 13 is illustrated in detail. Fixture 13 is constituted of a plurality of vertical, axially spaced, transverse, hollow supports 28 for mounting and retaining vertically the several axially spaced baffles 25 which support the plural tubes 12 of the heat exchanger in proper spaced relation to each other. The baffles 25 are of the usual perforated and truncated construction. They are provided with the usual horizontal rows 26 of spaced apertures, the apertures of each row being disposed in staggered relation to the apertures of their next adjacent rows. However, instead of being composed of rigid metal, the baffles 25 are constituted of a relatively soft, pliable or flexible gasket-like material composed, for example, of a suitable rubber-asbestos combination or mixture.

Each of the several transverse supports 28 for the baffles 25 includes a generally U-shaped base 29, each of which is fastened securely to a longitudinally extending bottom plate 30. The bottom plate 30 is secured to the movable work table 14, and functions to hold the tube and baffle supporting fixture 13 rigidly in place during assembly of the tubes 12 and baffles 25. Each base 29 supports a pair of vertically aligned or superimposed complemental concave components 31, 32 which function to receive and retain the baffles 25. Lower baffle retaining component 32 is fixed to its base 29, whereas the upper component 31 is secured hingedly to the base 29 by a pivot 33. By means of the pivots 33, each hinged upper baffle retaining component 31 may be swung to either an open or closed position, relative to its lower complemental component 32, as illustrated in FIG. 4. When the two components 31, 32 are closed, their complemental concave areas form a circular hollow for receiving and retaining a baffle 25.

Figure 3:
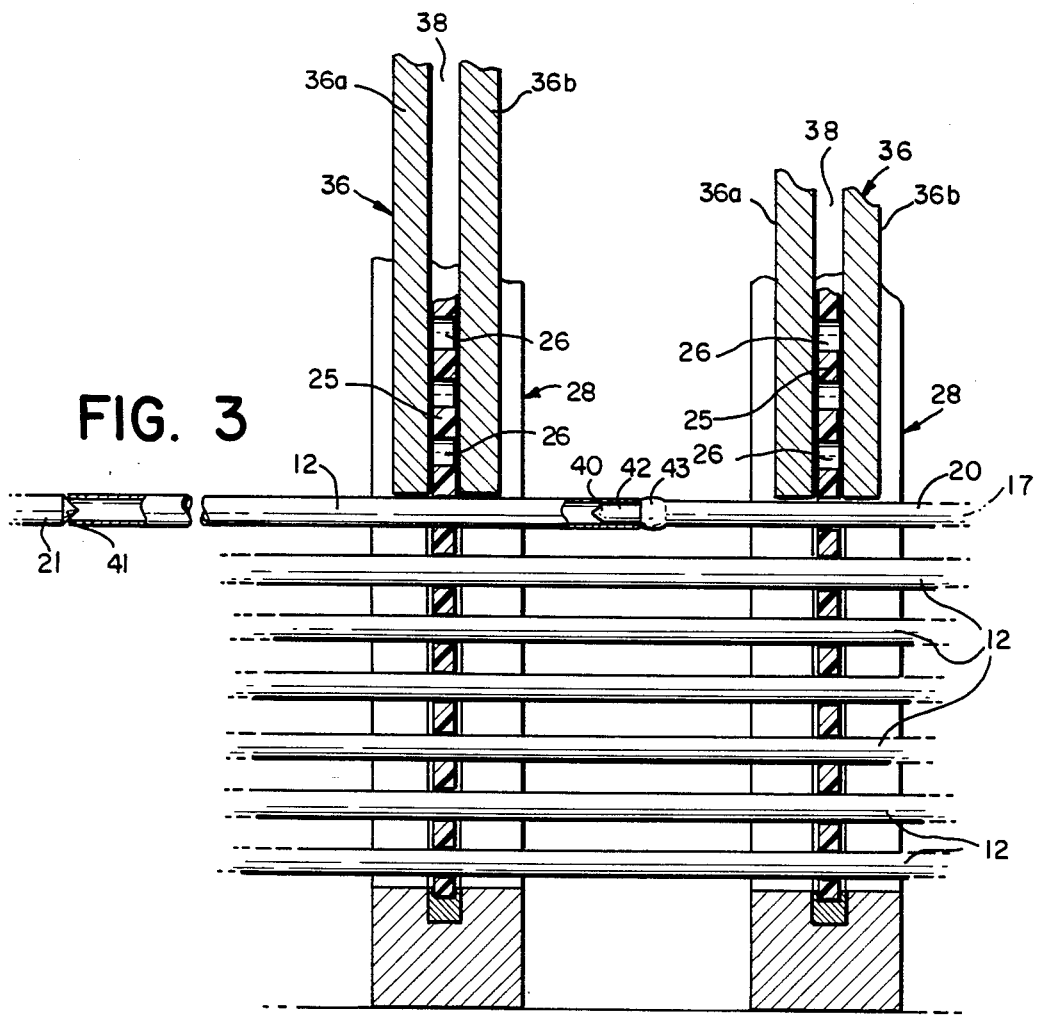
FIG. 3 is an enlarged fragmentary view in section looking in the direction of the arrows 3—3 of FIG. 2.

The upper baffle support components 31 are opened to permit insertion of the baffles 25. When they are closed, the components 31, 32 function to retain the several longitudinally spaced baffles 25 vertically, with the corresponding rows 26 of baffle apertures aligned horizontally. The corresponding apertures of the horizontally aligned rows are aligned axially to each other, whereby the tubes 12 may pass through the aligned apertures upon their transmittal to the fixture 13 by the guide rods 20, 21 (FIG. 3).

The several transverse supports 28 retain the succession of baffles 25 in alternating inverse order. Alternate supports 28 retain alternate baffles 25 in their lower support portions 32, with the horizontal truncated edges of the baffles facing upwardly. The intervening baffles 25 are supported in the upper portions 31 of the intervening supports 28, with their horizontal truncated edges facing downward. To aid in retaining the baffles 25 in proper alignment, the concave edges of the lower support components 32 may be provided with arcuate grooves 34. The arcuate edges of the lower, alternate baffles nest within the grooves 34, whereas only the lower edge portions of the upper, intervening baffles are engaged within the grooves.

In order to maintain the non-metallic gaskets 25 in proper vertical alignment relative to each other, with their corresponding apertures aligned axially during penetration by the probe rods 20 as they advance to the tube supply 11, and during the retraction of those rods in cooperation with the advancing insertion rods 21, to transmit tubes 12 to the baffle supporting fixture 13 for insertion through the rows 26 of baffle apertures, a baffle stabilizing fixture 35 is provided, as illustrated in FIGS. 1 and 2. The baffle stabilizing fixture 35 is constituted of a plurality of longitudinally spaced pairs 36 of rigid, vertical, closely spaced, transverse plates 36a, 36b (FIG. 3) which are secured to, and depend from, a horizontal master plate 37.

The individual plates 36a, 36b of each depending pair 36 of baffle support plates preferably are constituted of unperforated thin sheet metal, and are disposed transversely relative to the machine 10 and its tube and baffle holding fixture 13. Their width is substantially equal to the diametrical width of the hollows of the baffle supports 28 (FIG. 2). Their upper or proximal ends are affixed to the master plate by any suitable securing means, such as bolted brackets, welding, etc.

The imperforate plates 36a, 36b are closely spaced relative to each other, and define therebetween narrow vertical spaces or slots 38 which are slightly wider than the thickness of the two vertically aligned elements 31, 32 of the baffle supports 28 of the fixture 13. By way of example, for nonmetallic baffles 25 on the order of 0.125" in thickness, the components 31, 32 of the baffle supports 28 may be 0.200" in thickness and the spacing between each pair of baffle support plates 36a, 36b may be on the order of 0.210" in width. The distal ends of the plates 36a, 36b of each pair of plates 36 define or provide openings for the reception or insertion of the baffles 25 into the vertical slots or spaces 38.

As illustrated in FIG. 3, during tube assembly the individual baffle support plates 36a, 36b of each pair 36 of such plates are disposed parallel to, and on opposite sides of, one of the vertical baffles 25 supported by the hollow transverse supports 28 of the fixture 13. The lower horizontal edges of the distal ends of the depending baffle plates 36a, 36b always are disposed immediately above the guide rods 20, 21, i.e. above the working plane 17 (FIG. 1), so as to provide clearance for the rods and the tubes 12 during each tube insertion cycle of the machine 10. This is accomplished by controlling selectively the movement of the work table 14 following each tube insertion cycle. Because of the relatively small clearances, the pairs of plates 36 narrowly straddle or envelop their respective baffles 25 above the working plane 17, and thus are operative to stabilize the baffles, and retain them and their apertures in alignment during each tube insertion cycle of the machine 10.

More specifically, as the probe rods 20 advance to the tube supply 11, passing through the tube and baffle support fixture 13 and the baffle apertures aligned in the working plane 17, the pairs of plates 36 support the soft, non-metallic baffles 25 against bending or distortion, thus maintaining their verticality. Likewise, upon retraction of the guide rods 20 from the tube supply 11, in cooperation with the advancing insertion rods 21 to transmit the tubes 12 to the fixture 13, the pairs of plates 36 function to stabilize and maintain the verticality of the soft flexible baffles 25 as the tubes pass through their apertures.

The forward ends 40, 41, respectively, of the guide rods 20, 21 preferably are of the usual conical configuration to permit their limited entry into the open ends of the tubes 12. Such construction ensures the firm gripping of the tubes 12 by the rods 20, 21 during transmittal of the tubes of the fixture 13. Additionally, to facilitate passage of the guide rods 20, 21 and the tubes 12 through the apertures in the soft, pliable baffles 25, each forward end 40 of a probe rod 20 has an axial length or segment 42 of reduced diameter, the inner portion of which merges into an enlarged, ball-shaped protuberance 43. The decreased diameters of the distal ends 40 of the probe rods 20 reduce friction and the degree of pressure asserted against the soft baffles 25 when those rods penetrate the apertures of successive baffles 25 as they advance to the supply 11. Further, the ball-like protuberances 43 on the guide rods 20, upon retraction of those rods from the tube supply 11, function to enlarge slightly the apertures of the baffles 25 as they pass therethrough, thereby increasing clearance for the tubes 12 advancing from the supply 11 and passing through the baffles 25.

The baffle stabilizing fixture 35 is supported and maintained in position relative to the machine 10 by a rigid superstructure indicated generally by the reference numeral 50 (FIGS. 1, 2). Superstructure 50 includes a pair of horizontally spaced, vertical standards 51, 52 which, at their lower ends, are affixed at horizontally spaced locations to the front of the machine 10 by any suitable securing or fastening means 53, 54.

As best shown in FIG. 2, the upper end of vertical standard 52 is provided with a right-angled horizontal arm 55 which extends over and inwardly relative to the machine 10. Horizontal arm 55 terminates in a distal end 56 at a location spaced vertically above the longitudinal axis of the machine 10. Standard 51 is of identical construction to standard 52, having an inwardly extending, right-angled horizontal arm terminating in a distal end at a comparable location relative to the machine 10.

An elevated horizontal beam 57 extends longitudinally of the machine 10, and is connected to and supported by the horizontally spaced distal ends of the two standards 51, 52. Extending vertically downward from beam 57 are a pair of inclined, converging support arms 60, 61 which, at their junction, merge into a support bracket 62 of generally rectangular, box-like configuration. Support bracket 62 supports a pair of longitudinally spaced, hollow support bearings for mounting slidably a pair of spaced, cylindrical, axially slidable, transverse bars 65, 66. As illustrated in FIG. 2, bar 66 is supported horizontally and slidably by circular bearing 64 affixed to the support bracket 62, whereby transverse bar 66 may be advanced axially to the forward position illustrated in phantom at 66', and may be retracted rearwardly to its solid line position. A circular bearing identical in construction to bearing 64 is affixed to the opposite side of bracket 62, and supports slidably the horizontally movable transverse bar 65, whereby that bar also may be advanced and retracted relative to the machine 10 in the same manner as bar 66.

If desired, superstructure 50 also may include a third vertical standard 68 located at the rear of the machine 10 and secured to the floor on which the machine rests. Standard 68 is provided with a right-angled horizontal arm 69 which extends inwardly of the machine and connects to the support bracket 62, thereby further stabilizing the rigidity of the superstructure 50. An inclined support brace 70, extending between standard 68 and its horizontal arm 69, may be provided to add further stability to the supporting structure 50.

The baffle support fixture 35 is secured in operative position relative to the tube and baffle support fixture 13 by a vertical bolt 63 extending downwardly through a central bore in support bracket 62. As illustrated in FIG. 1, threads formed on the lower end of the bolt 63 engage within a correspondingly threaded hole formed in the horizontal master plate 37. When bolt 63 is fully engaged threadingly with plate 37, fixture 35 is clamped securely to support bracket 62, and thus maintained at a fixed location relative to fixture 13 during tube assembly. When the fixtures 35, 13 are thus located vertically relative to each other, as shown in FIGS. 1 and 2, each pair 36 of baffle support plates 36a, 36b straddles one of the baffles 25 above the working plane 17 of the machine, in the manner illustrated in FIG. 3.

The selected vertical and horizontal movements of the work table 14, during assembly of the tubes 12 in the fixture 13, are carried out by an actuating mechanism (not shown) of the type disclosed in U.S. Pat. No. 3,789,479 aforesaid. The table actuating means is operative to change automatically the position of the tube and baffle holding fixture 13 relative to the tube supply 11 and the guide rods 20, 21, following each deposit of tubes 12 in the fixture 13, preparatory to the next deposit of tubes therein. At the outset of the operation of the machine 10, before any tubes 12 have been deposited in fixture 13, the work table 14 is fully elevated relative to the machine and to the stationary baffle support fixture 35.

When work table 14 is fully elevated relative to fixture 35, the pairs 36 of baffle plates 36a, 36b substantially fully straddle or envelop their respective baffles 25. In such position, the working plane 17 is coincident with the lowermost rows 26 of baffle apertures, such rows being horizontally aligned, as explained previously. In practice, when the work table 14 is at its uppermost position, with the two fixtures 13, 35 properly aligned, approximately 3/16" of the lowermost portions of the baffles 25 are exposed between the distal ends of the plates 36a, 36b and the bottom portions of the concave surfaces of the lower baffle support components 32.

As the tube assembling operation of the machine 10 proceeds, work table 14 is caused to descend vertically by successive incremental distances sufficient to bring each succeeding row 26 of baffle apertures into the working plane 17 of the machine, following which the guide rods 20, 21 deposit the selected number of tubes 12 in the aligned apertures disposed in the working plane. With each downward movement of the work table 14, a corresponding and incremental horizontal movement is imparted to the work table 14. Such movements compensate for the staggered relationship between the baffle apertures, and ensure that, in each successive adjustment of the rows 26 of the baffles 25 into the working plane 17, their apertures are properly aligned axially with the guide rods 20, 21.

A highly important advantage of this invention resides in the fact that the baffle stabilizing fixture 35 may be readily installed on, or removed from, the machine 10 without disrupting its capacity for assembling the tubes 12 in a heat exchanger irrespective whether its baffles 25 are made of metal or of a non-metallic material. This is achieved by the horizontal support bars 65, 66 mounted slidably internally of their respective circular bearings, illustrated by bearing 64 in FIG. 2.

Affixed to the longitudinally spaced ends of the master plate 37 are a pair of horizontally spaced, upwardly extending, vertical arms 72, 73. Extending inwardly from the upper ends of the vertical arms 72, 73, respectively, are grooved rotatable bearings 74, 75. The two roller bearings 74. 75 are spaced apart longitudinally, and are disposed, respectively, above the horizontally slidable bars 65, 66. By reason of their grooved construction, the rotatable roller bearings or wheels 74, 75 are adapted to rest on the horizontal bars 65, 66, with capacity for rolling movement thereon, incidental to installing the fixture 35 on, or removing it from, the tube assembly machine 10.

If it is desired to remove the fixture 35, in order to utilize machine 10 for assembling metallic baffles in heat exchangers, one need only remove the threaded bolt 63, whereby fixture 35 may be lowered so that its rollers 74, 75 come into contact with, and are supported by, the horizontal bars 65, 66. With the fixture 35 now supported by bars 65, 66, the bars may be advanced slidably outwardly of the machine, to the position indicated by reference numeral 66' in FIG. 2, whereupon the fixture 35 is rolled out to their forward ends and then manually elevated and removed. Thereupon, the support rods 65, 66 may be pushed back, transversely relative to the machine, to their full line position illustrated in FIG. 2, following which the machine is ready for use in assembling metallic baffles. The slidable relationship between support bars 65, 66 and their respective support bearings enables the quick and easy removal and replacement of the baffle support fixture 35 in the machine 10 as required.

Thus, the superstructure 50, by means of its inclined support arms 60, 61, bracket 62 and threaded bolt 63, provides a fixed supporting structure for retaining the baffle support fixture 35 in operative position relative to the tube and baffle support fixture 13 and its selectively movable work table 14. By reason of the threaded bolt 63, the horizontally slidable support bars 65, 66 and the rotatable support wheels 74, 75, the fixture 35 may be quickly assembled with the machine 10, or quickly disassembled therefrom, as required.

Although a preferred embodiment of this invention has been shown and described for the purpose of illustration, it is to be understood that various changes and modifications may be made therein without departing from the spirit and utility of the invention, or from the scope thereof as set forth in the appended claims.

We claim:

1. A baffle stabilizing fixture for a machine for assembling tubes and perforated baffles in a heat exchanger, said machine including a work table having capacity for selected vertical and horizontal movements, a tube and baffle holding fixture mounted on the work table and guide rod means for advancing selected quantities of tubes from a tube supply to the tube and baffle holding fixture for insertion into the perforated baffles, characterized by
    (a) a master plate located in spaced relation to the tube and baffle holding fixture and
    (b) plural pairs of closely spaced baffle support plates extending from the master plate to the tube and baffle holding fixture,
    (c) each said pair of baffle support plates having a narrow space intermediate the plates of which said pair is constituted to provide a slot for reception of a baffle supported by the tube and baffle holding fixture during tube assembly, said pairs of baffle support plates being operative to stabilize the baffles during insertion of the tubes into the baffles.

2. The baffle stabilizing fixture of claim 2, characterized by a supporting structure for mounting said fixture at a fixed location relative to the tube and baffle holding fixture to stabilize the baffles during tube assembly.

3. A baffle stabilizing fixture for a machine for assembling tubes and perforated baffles in a heat exchanger, said machine including a work table having capacity for selected vertical and horizontal movements, a tube and baffle holding fixture mounted on the work table and guide rod means for advancing selected quantities of tubes from a tube supply to the tube and baffle holding fixture for insertion into the perforated baffles, characterized by
    (a) a master plate located in spaced relation to the tube and baffle holding fixture,
    (b) plural pairs of closely spaced baffle support plates extending from the master plate to the tube and baffle holding
    (c) each said pair of baffle support plates having a narrow space intermediate the plates of which said pair is constituted to provide a slot for reception of a baffle supported by the tube and baffle holding fixture during tube assembly, said pairs of baffle support plates being operative to stabilize the baffles during insertion of the tubes into the baffles, and
    (d) a supporting structure for mounting said baffle stabilizing fixture at a fixed location relative to the tube and baffle holding fixture during tube assembly,
    (e) said supporting structure including movable support bars for said baffle stabilizing fixture, said bars having a retracted position when said fixture is mounted at the fixed location and an advanced position for removal of said fixture from the machine.

4. Apparatus for assembling heat exchanger tubes with perforated baffles in an automatic tube assembling machine having a movable work table, a tube supply, a tube and baffle holding fixture secured to the work table and two sets of guide rods for advancing successively selected quantities of tubes from the tube supply to the tube and baffle holding fixture, said apparatus being characterized by
    (a) a plurality of relatively flat support components for supporting a plurality of baffles in axially spaced relation to each other in the tube and baffle holding fixture,
    (b) a fixture for stabilizing the baffles during assembly of the tubes and baffles in the tube and baffle holding fixture,
    (c) said baffle stabilizing fixture being positioned at a fixed location relative to the tube and baffle holding fixture and comprising
        (i) a master plate disposed in spaced relation to the tube and baffle holding fixture and
        (ii) plural pairs of closely spaced baffle support plates extending from the master plate to the tube and baffle hold fixture,
        (iii) said pairs of baffle support plates each defining narrow spaces for reception of one of the baffles supported by the tube and baffle holding fixture, whereby said pairs of baffle support plates stabilize and support the baffles during tube assembly, and
    (d) the guide rods of one of the two sets of guide rods each having distal ends of reduced cross-section and enlarged protuberances adjacent said distal ends to facilitate penetration of said guide rods through the perforated baffles during passage of the rods to and from the tube supply.

5. The apparatus of claim 7, characterized by
    (a) a supporting structure for mounting the baffle stabilizing fixture at a fixed location relative to the tube and baffle holding fixture during tube assembly,
    (b) said supporting structure including movable support bars for the baffle stabilizing fixture,
    (c) said support bars having an advanced position relative to the machine for installing the baffle stabilizing fixture on the machine and for removing said fixture from the machine, and a retracted position when the baffle stabilizing fixture is mounted at said fixed location.

* * * * *

UNITED STATES PATENT OFFICE
CERTIFICATE OF CORRECTION

PATENT NO. : 4,785,518
DATED : November 22, 1988
INVENTOR(S) : Morton F. Zifferer and Richard J. Tarlton It is certified that error appears in the above-identified patent and that said Letters Patent is hereby corrected as shown below:

Claim 2:  col. 7, line 54   change "2" to --1--

Claim 3:  col. 8, line 3    after "holding" insert --fixture,--

Claim 4:  col. 8, line 42   delete "hold" and substitute --holding fixture,--

Claim 4:  col. 8, line 43   delete "fixture,"

Signed and Sealed this

Fifteenth Day of August, 1989

Attest:

DONALD J. QUIGG

Attesting Officer

Commissioner of Patents and Trademarks